United States Patent
Midorikawa

(10) Patent No.: US 7,761,207 B2
(45) Date of Patent: Jul. 20, 2010

(54) SEAT BELT DEVICE

(75) Inventor: Yukinori Midorikawa, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 552 days.

(21) Appl. No.: 11/665,555

(22) PCT Filed: Oct. 26, 2005

(86) PCT No.: PCT/JP2005/019696

§ 371 (c)(1),
(2), (4) Date: Apr. 16, 2007

(87) PCT Pub. No.: WO2006/046605

PCT Pub. Date: May 4, 2006

(65) Prior Publication Data

US 2009/0048739 A1    Feb. 19, 2009

(30) Foreign Application Priority Data

Oct. 29, 2004  (JP)  ............................. 2004-316205
Oct. 29, 2004  (JP)  ............................. 2004-316215

(51) Int. Cl.
*B60R 22/00* (2006.01)
(52) U.S. Cl. .................... 701/45; 280/807; 297/474
(58) Field of Classification Search ................ 180/268, 180/269, 270; 242/374, 370, 371, 382; 280/806, 280/807, 29, 727, 728.1, 734, 735, 801.1, 280/801.2, 804, 805, 808; 701/45, 1, 36
See application file for complete search history.

(56) References Cited

U.S. PATENT DOCUMENTS

| | | | |
|---|---|---|---|
| 4,225,185 A | 9/1980 | Krzok | |
| 4,659,108 A | 4/1987 | Sack et al. | |
| 4,840,324 A * | 6/1989 | Higbee et al. | ............ 242/385.4 |
| 4,966,394 A * | 10/1990 | Thomas et al. | .............. 280/807 |
| 5,615,917 A * | 4/1997 | Bauer | ......................... 280/806 |
| 5,765,774 A * | 6/1998 | Maekawa et al. | ........ 242/390.9 |
| 6,255,790 B1 * | 7/2001 | Popp et al. | .................. 318/280 |
| 6,499,554 B1 * | 12/2002 | Yano et al. | .................. 180/268 |
| 6,575,394 B1 * | 6/2003 | Fujita et al. | .............. 242/390.8 |
| 2002/0130545 A1 | 9/2002 | Tanji | |
| 2006/0087108 A1 | 4/2006 | Midorikawa | |

FOREIGN PATENT DOCUMENTS

EP    0 278 387 A    8/1988

(Continued)

OTHER PUBLICATIONS

English translation of Office Action from counterpart Korean Application.

(Continued)

*Primary Examiner*—Khoi Tran
*Assistant Examiner*—Stephen Holwerda
(74) *Attorney, Agent, or Firm*—Harness, Dickey & Pierce, P.L.C.

(57) ABSTRACT

A seat belt device includes a detecting unit and a controller which controls a motor to rotate in a winding direction of a webbing when the detecting unit detects that an adjust-through which adjusts a position of a D-ring through which the webbing is inserted is moved down.

10 Claims, 14 Drawing Sheets

FOREIGN PATENT DOCUMENTS

| | | |
|---|---|---|
| EP | 1 243 486 A | 9/2002 |
| GB | 2 018 574 A | 10/1979 |
| GB | 1 210 323 A | 10/2007 |
| JP | 62-61859 A | 3/1987 |
| JP | 11-326735 A | 11/1999 |
| JP | 11326735 A * | 11/1999 |
| JP | 2001-1163185 A | 6/2001 |
| JP | 2002-12128 A | 1/2002 |
| JP | 2002-203140 | 7/2002 |
| JP | 2004-262257 A | 9/2004 |
| KR | 2004-0007277 | 1/2004 |
| WO | 2004/065183 A1 | 8/2004 |

OTHER PUBLICATIONS

English Translation of International Preliminary Report on Patentability for PCT/JP2005/019696, ISA/IB, Geneva, issued May 1, 2007.

* cited by examiner

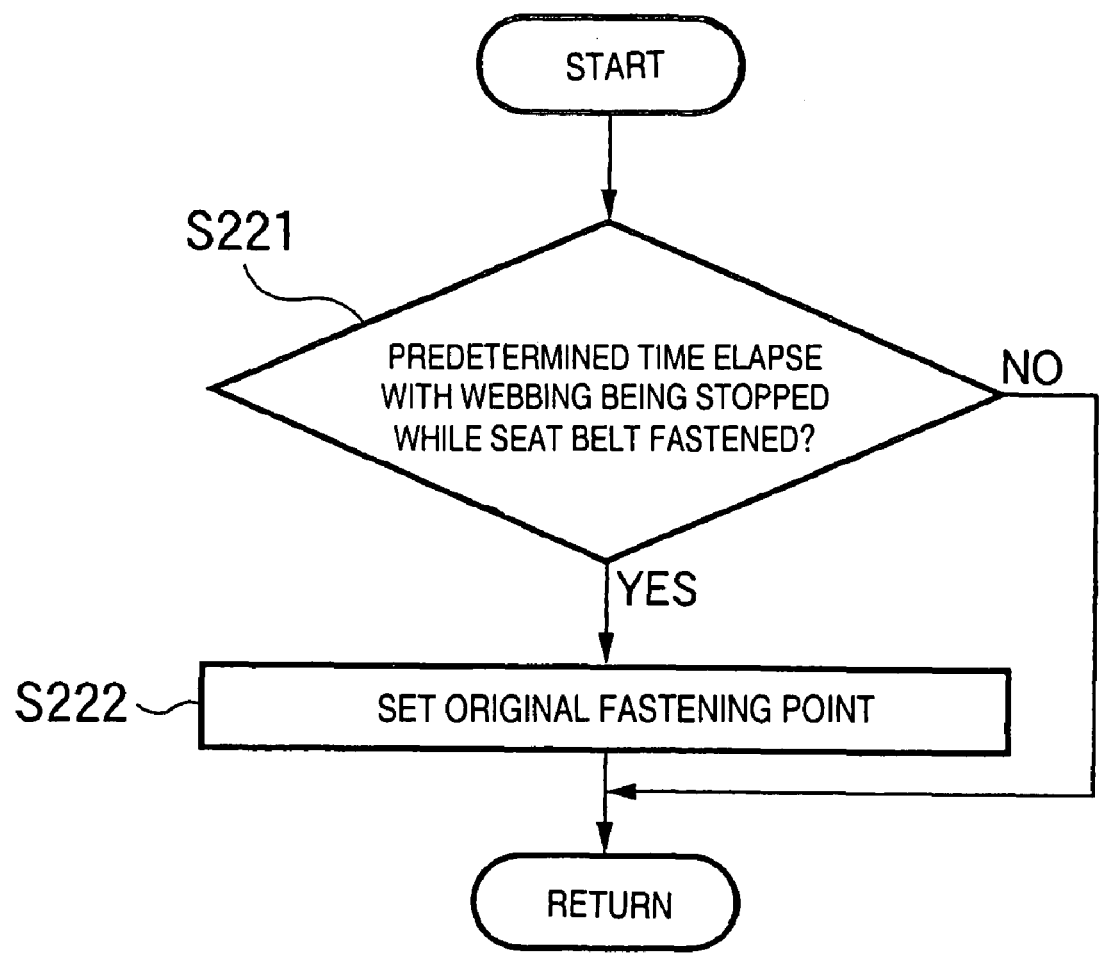

SEAT BELT DEVICE

TECHNICAL FIELD

The present invention relates to a seat belt device, and more specifically, to a seat belt device in which a looseness of a webbing is removed when a seat is moved while the webbing is being fastened.

BACKGROUND ART

A seat belt device in which an electric motor rotates a spindle to wind a webbing when necessary, whereby an occupant is held in a seat is known and referenced herein as a conventional seat belt device (see, e.g., Patent Document 1). In the conventional seat belt device, a clutch is provided in a retractor. The clutch is released when the occupant draws out and fastens the webbing upon riding on a vehicle, whereby a drawing-out resistance of the webbing is generally in a lowered state.

In a seat belt device having a retractor which winds the webbing by a winding spring, a winding force of the winding spring that has been set to be strong to some extent is set to be very weak in advance, whereby the webbing is easily drawn out and any feeling of pressure from the webbing is decreased while fastening the webbing.

However, in such a seat belt device, since the winding force of the winding spring is weak, it is difficult to completely store the webbing due to a friction between a D-ring and the webbing or due to a weight of a tongue. Thus, in such a seat belt device, there has been proposed to assist a winding by using a motor at the time of the storage. More specifically, when the motor rotates in a winding direction, the clutch is set to a power transmittable state and thus the winding assistance is made possible. When the storage is completed, the motor stops assisting the winding and rotates in a direction opposite to the winding direction, whereby the clutch is set to a power transmission disabled state and returns in the original state, and thus the webbing is only forced by a weak webbing force of the winding spring.

Patent Document 1: Japanese Patent Unexamined Publication No. 2001-163185

DISCLOSURE OF THE INVENTION

Problems to be solved by the Invention

However, in such a seat belt device, in a case where a seat is moved backward or a seat back is reclined backward while the seat belt is fastened, looseness generated between the occupant and the webbing may be not removed since the winding force of the winding spring is weak. In the previous seat belt device, since the winding force of the webbing while being fastened is 2 N or more, the looseness can be removed. However, in the seat belt device using a winding spring with a weak winding force, since the winding force while the webbing being fastened is set in the range of 0.5 N to 2 N, the looseness cannot be removed.

In the seat belt device, in order to adjust a position of the D-ring serving as a webbing guide through which the webbing is inserted, an adjust-through serving as a guide-position adjusting unit is provided. The adjust-through supports the middle portion of the webbing and is movable in an up-and-down direction with respect to the vehicle. Even if the webbing is stored without looseness, the looseness is generated in the webbing when the adjust-through moves down. In a seat belt device in which the winding force is set to be strong to some extent, regardless of the weight (about 70 g) of the tongue and the friction between the webbing and the D-ring exist, the webbing can be pulled up together with the tongue, without causing any looseness. However, in the above-described seat belt device in which the winding spring with the weak winding force (in the range of 0.5 N to 2 N) is used, although the loosened webbing between the D-ring and the winding device can be wound, the loosened webbing between the D-ring and a wrap anchor to which the tongue is locked cannot be lifted up due to the weight of the tongue and the friction between the D-ring and the webbing, whereby the looseness of the webbing remains. As a result, the stored webbing may become loose so that the tongue may collide with interior items of the vehicle, thereby providing discomfort with sounds or damaging the interior items.

The present invention has been achieved in view of the above circumstance, and it is an object thereof to provide a seat belt device in which looseness of a webbing can be removed. Specifically, a main first object is to provide a seat belt device in which the looseness between an occupant and the webbing can be removed when a state of a seat varies in such a way that the webbing becomes loose while the webbing is being fastened. In addition, a second object is to provide a seat belt in which the webbing is not loosened even when an adjust-through is moved down so as not to be in a loose storing state.

Means for Solving the Problems

The above-mentioned objects of the invention are accomplished by the following configurations.

(1) A seat belt device comprising:

a spindle which winds a webbing;

a power generating unit which generates a power for rotating the spindle in a desired direction;

a power transmitting unit which is set to a power transmittable state when the power generating unit generates the power for rotating the spindle in a winding direction of the webbing, the power from the power generating unit being transmittable to the spindle in the power transmittable state, and is set to a power transmission disabled state when the power generating unit generates a power in a direction opposite to the power for rotating the spindle in the winding direction, the power from the power generating unit being disabled to be transmitted to the spindle in the power transmission disabled state;

a control unit which controls the power generating unit; and a looseness detecting unit which detects a looseness in the webbing, wherein the control unit controls the power generating unit to rotate in the winding direction of the webbing when the looseness detecting unit detects the looseness.

(2) The seat belt device according to (1), wherein the control unit controls the power generating unit to rotate in the winding direction of the webbing when the looseness detecting unit detects the looseness, and thereafter, controls the power generating unit to rotate in the direction opposite to the winding direction so as to set the power transmitting unit to the power transmission disabled state.

(3) The seat belt device according to (1) or (2), wherein the looseness detecting unit is a rotary sensor which detects a rotation amount of the spindle.

(4) The seat belt device according to any one of (1) to (3), further comprising a guide-position adjusting unit which adjusts a position of a webbing guide through which the webbing is inserted, wherein the looseness detecting unit is guide-position variation detecting unit which detects that the guide-position adjusting unit is moved down, and the control unit controls the power generating unit to rotate in the winding direction of the webbing when the guide-position variation detecting unit detects that the guide-position adjusting unit is moved down, and thereafter, the control unit controls the power generating unit to rotate in a direction opposite to the winding direction so as to set the power transmitting unit to the power transmission disabled state.

(5) The seat belt device according to any one of (1) to (3), wherein the looseness detecting unit is seat state detecting unit which detects a variation in a state of a seat, and the control unit controls the power generating unit to rotate in the winding direction of the webbing when the seat state detecting unit detects such a variation in a state of the seat that the webbing is loose while the webbing is fastened, and thereafter, the control unit controls the power generating unit to rotate in a direction opposite to the winding direction so as to set the power transmitting unit to the power transmission disabled state.

(6) A seat belt device comprising:
a spindle which winds a webbing;
a power generating unit which generates a power for rotating the spindle in a desired direction;
a power transmitting unit which is set to a power transmittable state when the power generating unit generates the power for rotating the spindle in a winding direction of the webbing, the power from the power generating unit being transmittable to the spindle in the power transmittable state, and is set to a power transmission disabled state when the power generating unit generates a power in a direction opposite to the power for rotating the spindle in the winding direction, the power from the power generating unit being disabled to be transmitted to the spindle in the power transmission disabled state;
a control unit which controls the power generating unit; and
a seat state detecting unit which detects a variation in a state of a seat,
wherein the control unit controls the power generating unit to rotate in the winding direction of the webbing when the seat state detecting unit detects such a variation in a state of the seat that the webbing is loose while the webbing is fastened.

(7) The seat belt device according to (6), wherein the control unit controls the power generating unit to rotate in the winding direction of the webbing when the seat state detecting unit detects such a variation in a state of the seat that the webbing is loose while the webbing is fastened, and thereafter, the control unit controls the power generating unit to rotate in a direction opposite to the winding direction so as to set the power transmitting unit to the power transmission disabled state.

(8) The seat belt device according to (6) or (7), wherein the seat state detecting unit is a rotary sensor which detects a rotation amount of the spindle.

(9) The seat belt device according to (6) or (7), wherein the seat state detecting unit is at least one of seat movement detecting unit which detects that the seat is moved in a back-and-forth direction and seat back movement detecting unit which detects that a seat back is reclined.

(10) A seat belt device comprising:
a spindle which winds a webbing;
a power generating unit which generates a power for rotating the spindle in a desired direction;
a power transmitting unit which is set to a power transmittable state when the power generating unit generates the power for rotating the spindle in a winding direction of the webbing, the power from the power generating unit being transmittable to the spindle in the power transmittable state, and is set to a power transmission disabled state when the power generating unit generates a power in a direction opposite to the power for rotating the spindle in the winding direction, the power from the power generating unit being disabled to be transmitted to the spindle in the power transmission disabled state;
a control unit which controls the power generating unit;
a guide-position adjusting unit which adjusts a position of a webbing guide through which the webbing is inserted; and
a guide-position variation detecting unit which detects a variation in a position of the guide-position adjusting unit,
wherein the control unit controls the power generating unit to rotate in the winding direction of the webbing when the guide-position variation detecting unit detects that the guide-position adjusting unit is moved down.

(11) The seat belt device according to (10), wherein the control unit controls the power generating unit to rotate in the winding direction of the webbing when the guide-position variation detecting unit detects that the guide-position adjusting unit is moved down, and thereafter, the control unit controls the power generating unit to rotate in a direction opposite to the winding direction so as to set the power transmitting unit to the power transmission disabled state.

(12) The seat belt device according to (10) or (11), wherein the guide-position variation detecting unit is a rotary sensor which detects a rotation amount of the spindle.

Advantage of the Invention

In a seat belt device according to the present invention, when a looseness of a webbing is detected, a power generating unit is controlled to rotate in a winding direction of a webbing. Accordingly, the looseness of the webbing can be removed.

Further, in a seat belt device according to the present invention, when such a variation in a state of the seat that the webbing is loose is detected while the webbing is fastened, the power generating unit is controlled to rotate in the winding direction of the webbing. Accordingly, the looseness of the webbing on an occupant can be removed by driving the power generating unit to wind the webbing, whereby the webbing is further reliably fastened.

According to the seat belt device of the invention, when such a variation in a state of the seat that the webbing is loose is detected while the webbing fastened, the power generating unit is controlled to rotate in the winding direction of the webbing. Then, the power generating unit is controlled to rotate in the direction opposite to the winding direction so as to set the power transmitting unit to the power transmission disabled state. Accordingly, since only a weak winding force acts on the spindle, the webbing can be easily drawn in use.

According to the seat belt device of the invention, when the moving down of the guide-position adjusting unit is detected, the control unit controls the power generating unit to rotate in the winding direction of the webbing. Accordingly, the loose webbing due to the moving down of the guide-position adjusting unit is wound. Accordingly, even when the guide-position adjusting unit moved down, the webbing does not become loose. Consequently, the stored state is not loose and quality can be improved.

According to the seat belt device of the invention, when the moving down of the guide-position adjusting unit is detected, the control unit controls the power generating unit to rotate in the winding direction of the webbing. Then, the control unit controls the power generating unit to rotate in the direction opposite to the winding direction so as to set the power transmitting unit to in the power transmission disabled state. Accordingly, since only a weak winding force acts on the spindle after the control, the webbing can be easily drawn in use.

BRIEF DESCRIPTION OF THE DRAWINGS

FIG. 10: It is a flowchart showing another method of setting an original fastening point.

FIG. 11A is a schematic diagram illustrating a configuration of a rotary sensor, and FIGS. 11B and 11C are diagrams illustrating a detecting method thereof.

DESCRIPTION OF REFERENCE NUMERALS

10 Seat Belt Device
11 Webbing
12 Spindle
15 Motor (Power Generating Unit)
16 Gear Assembly
17 Clutch (Power Transmitting Unit)
18 Damper Spring (Power Transmitting Unit)
19 Rotary Sensor (Looseness Detecting Unit, Seat State Detecting Unit, or Guide-Position Variation Detecting Unit)
20 Controller (Control Unit)
23 Seat Movement Detecting Unit (Looseness Detecting Unit or Seat State Detecting Unit)
24 Seat Back Movement Detecting Unit (Looseness Detecting Unit or Seat State Detecting Unit)
25 Buckle Switch
52 Adjust-Through (Guide Portion Adjusting Unit)
53 D-ring (Webbing Guide)

BEST MODE FOR CARRYING OUT THE INVENTION

Hereinafter, a seat belt device according to a first embodiment of the invention will be described in detail with reference to the drawings.

Figure 1:
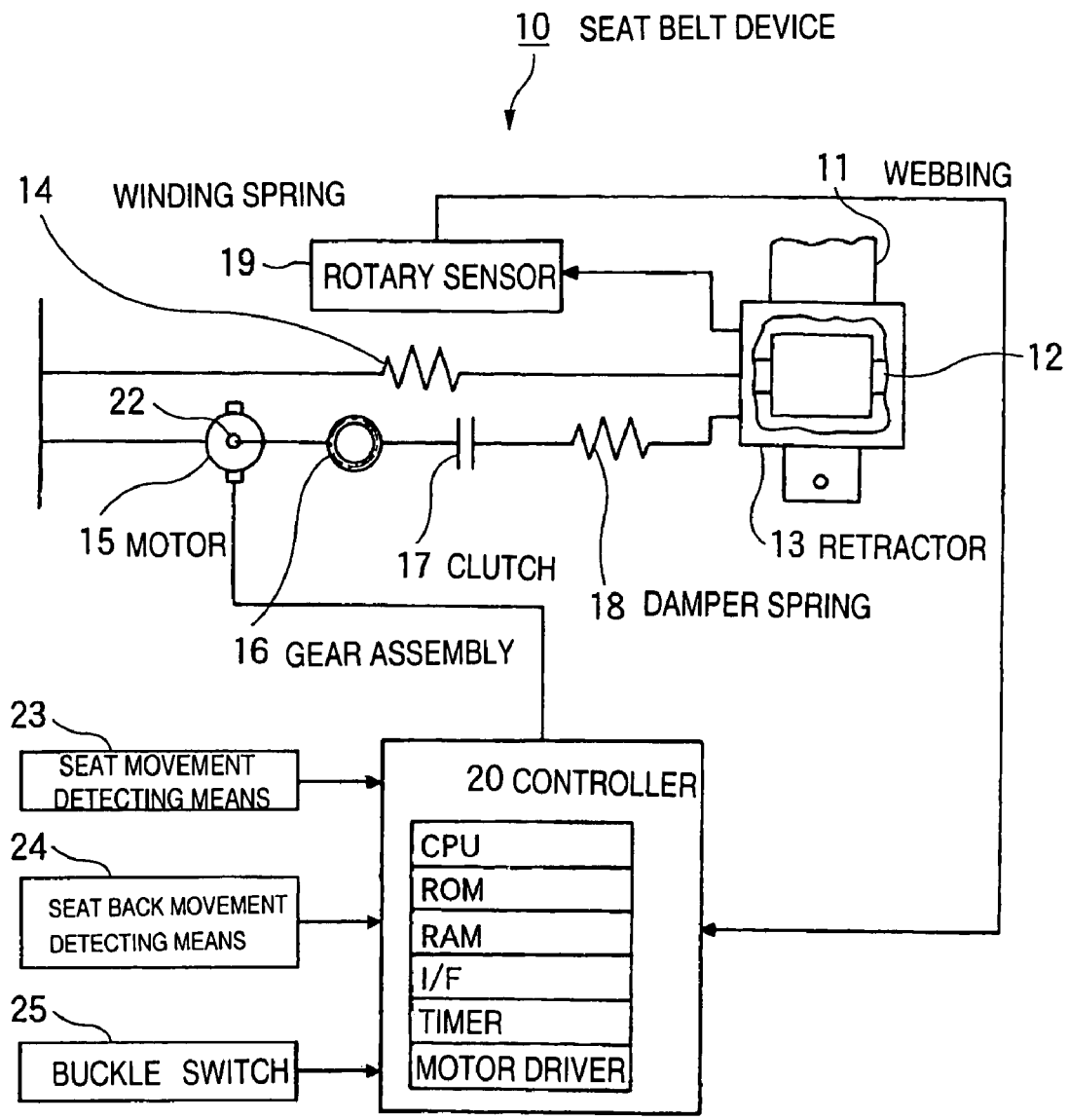
FIG. 1: It is a block diagram of a seat belt device of a first embodiment according to the invention.
Figure 2:
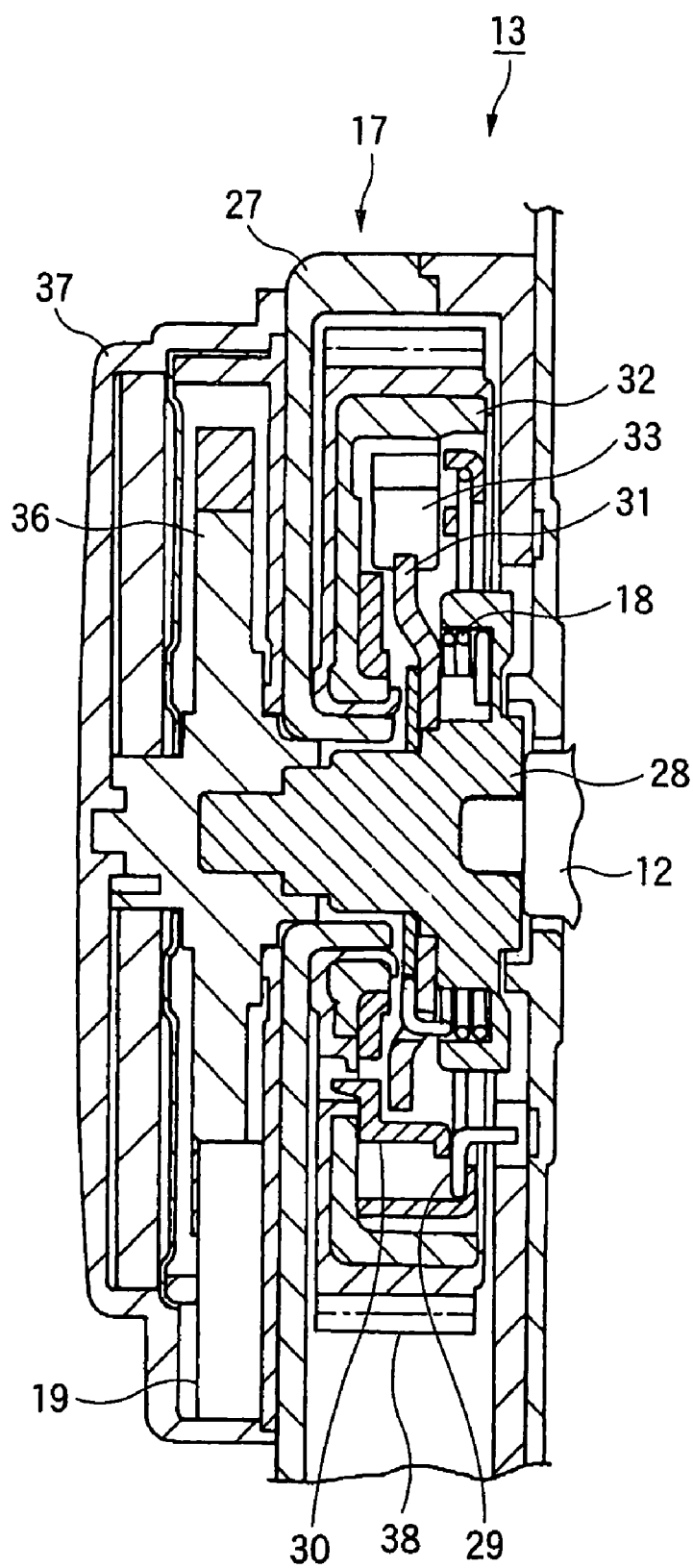
FIG. 2: It is a sectional view of a clutch used in the seat belt device shown in FIG. 1.
Figure 5:
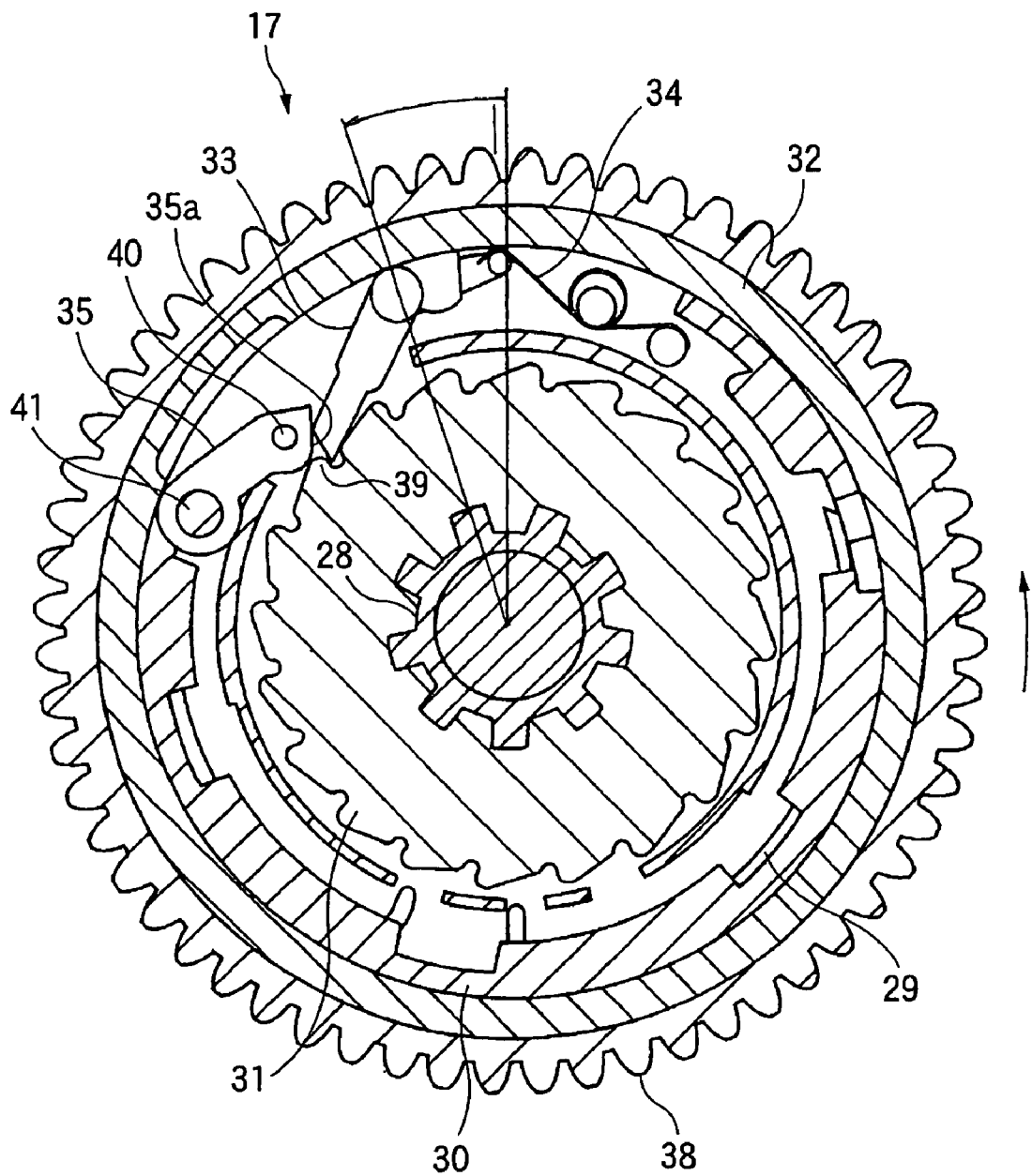
FIG. 5: It is a diagram showing an operation of the clutch shown in FIG. 2.
Figure 6:
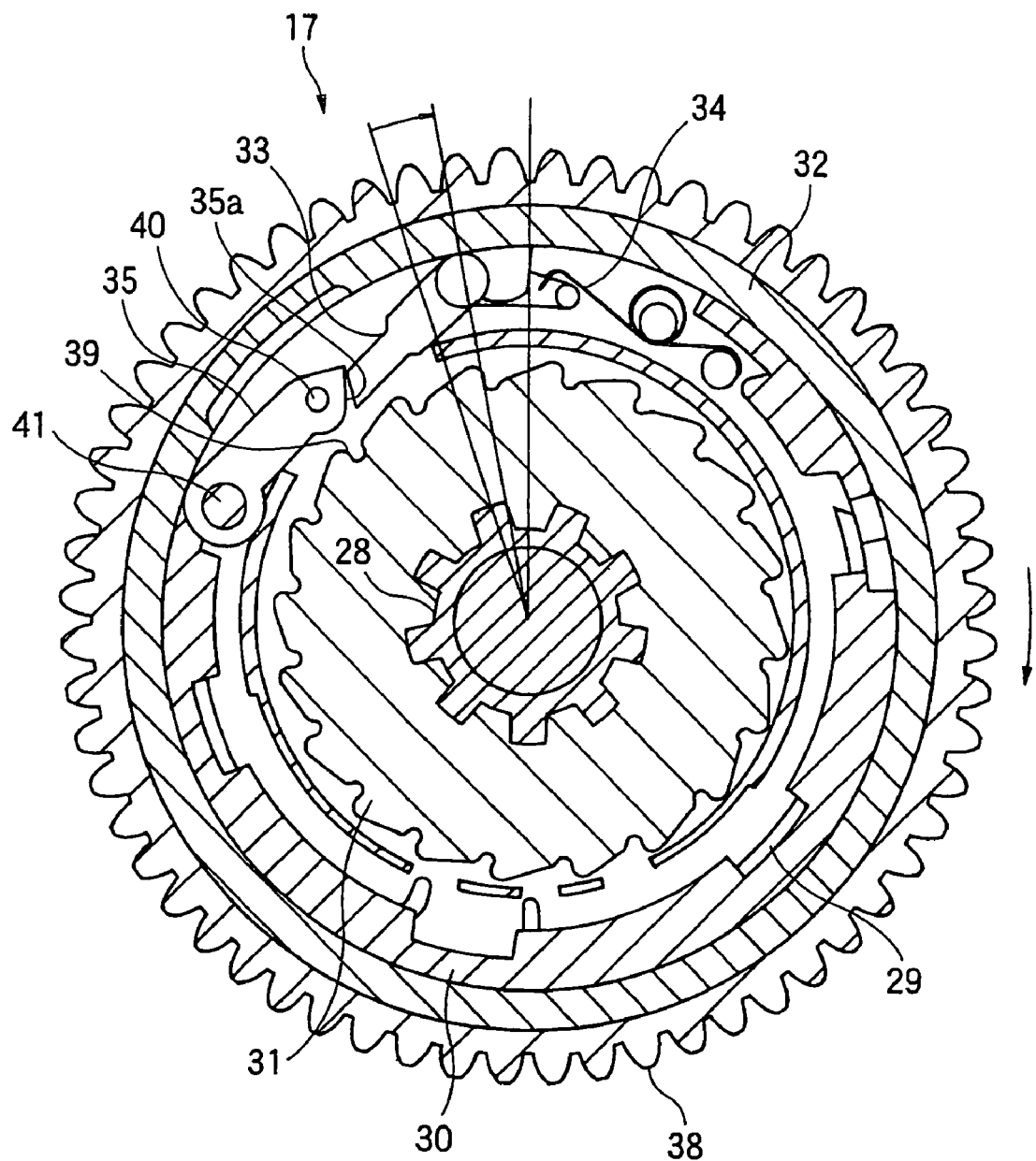
FIG. 6: It is a diagram showing an operation of the clutch shown in FIG. 2.
Figure 7:
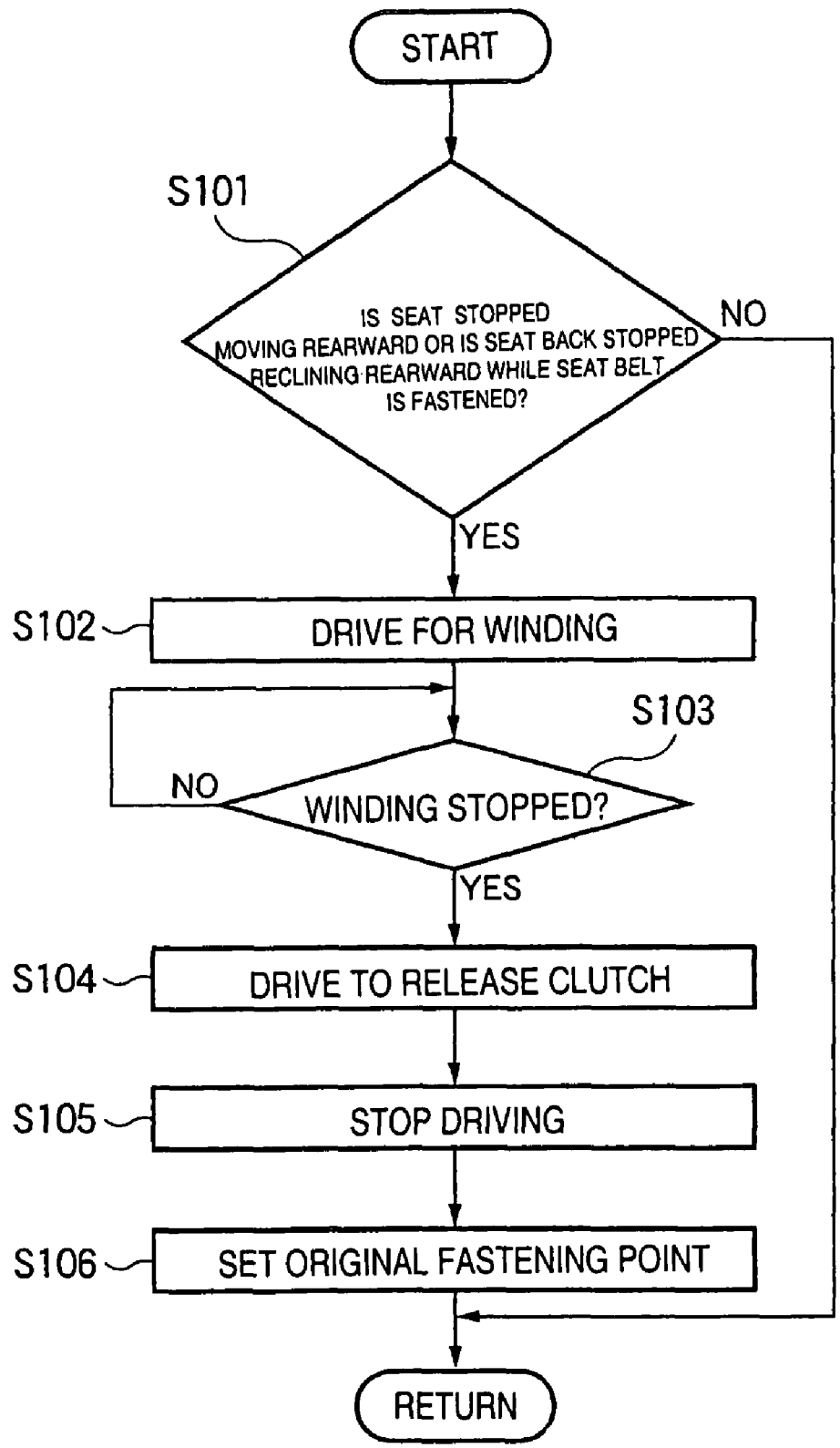
FIG. 7: It is a flowchart showing a first example of control operation of the seat belt device shown in FIG. 1.
Figure 8:
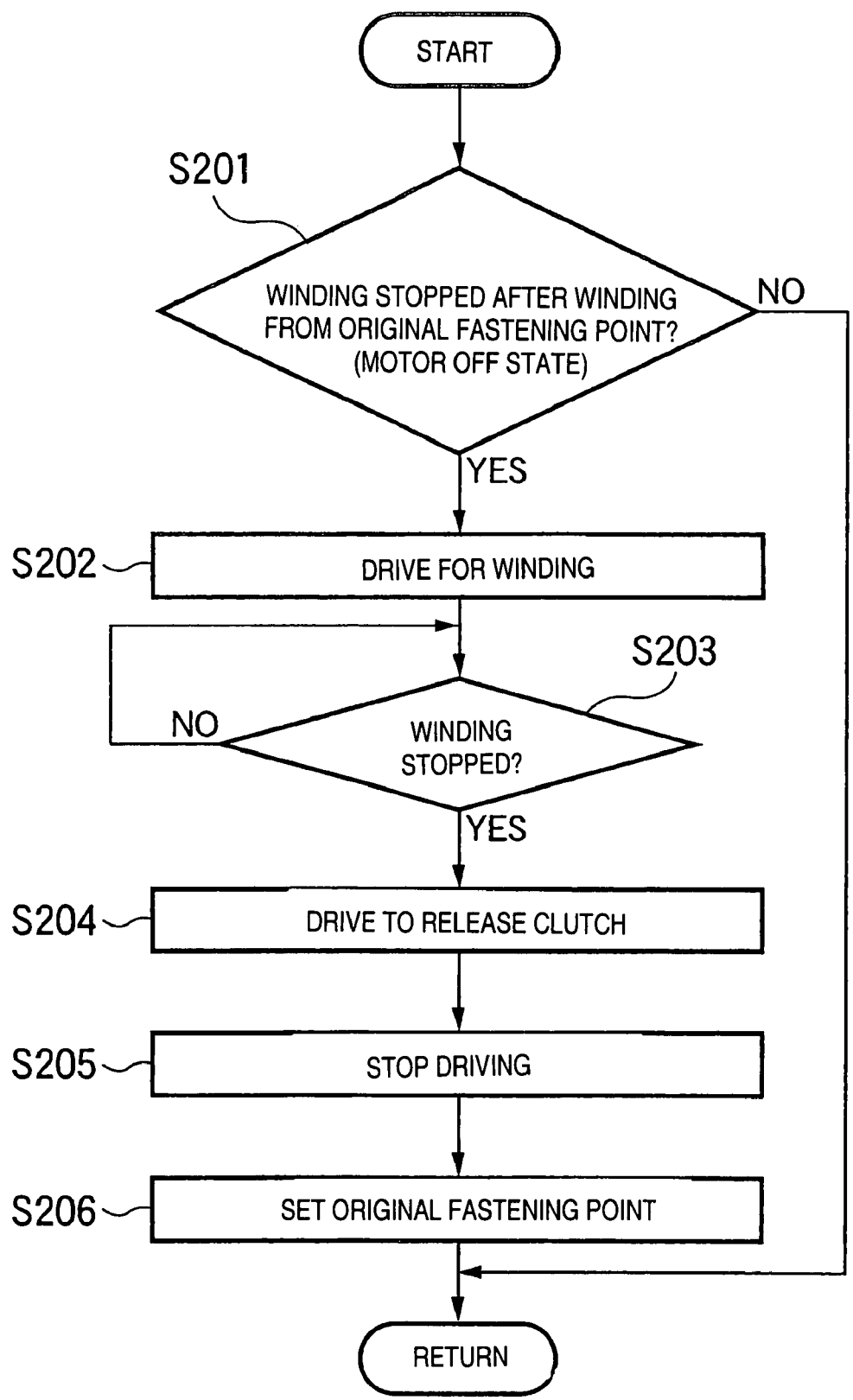
FIG. 8: It is a flowchart showing a second example of control operation of the seat belt device shown in FIG. 1.
Figure 9:
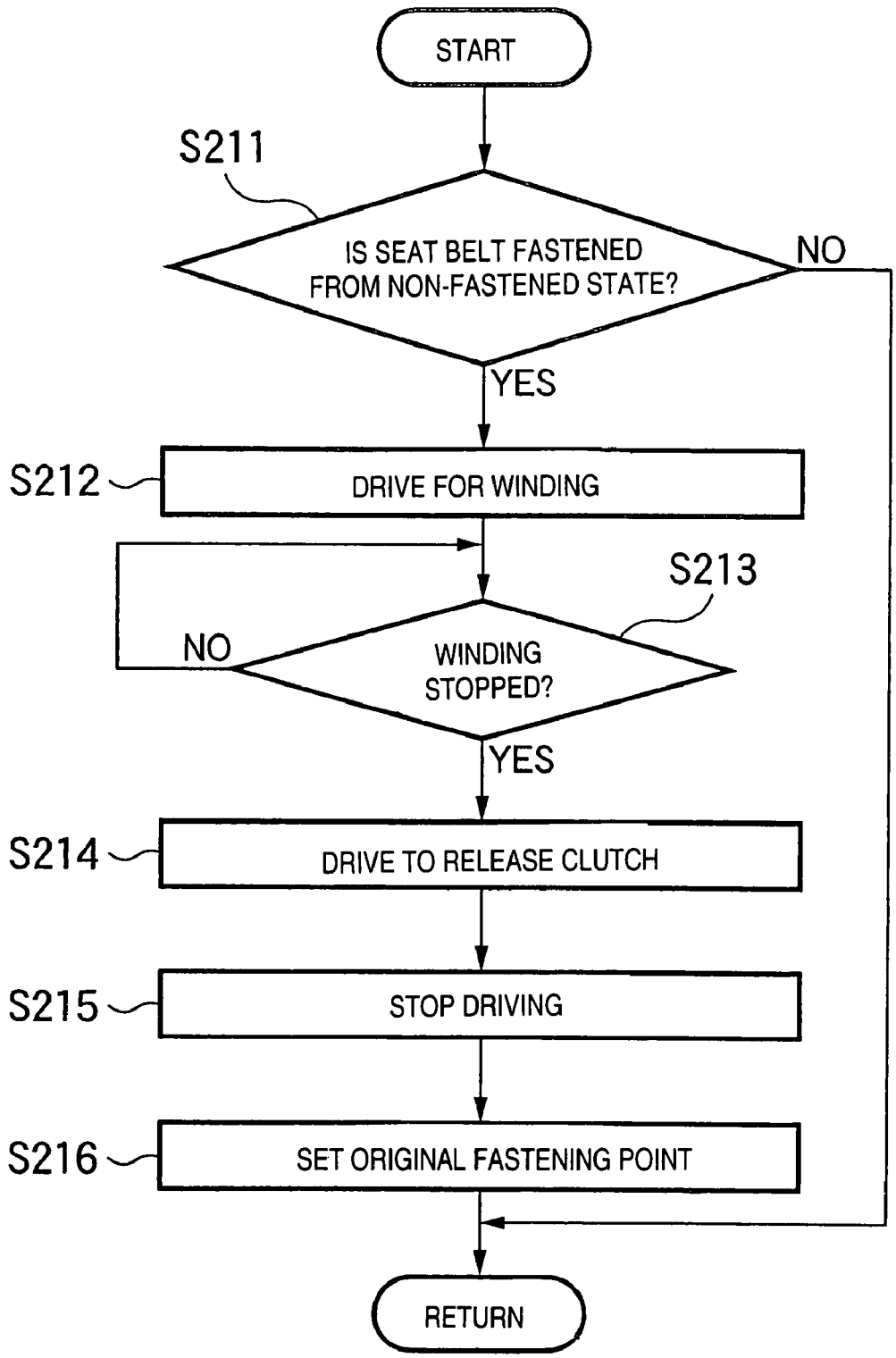
FIG. 9: It is a flowchart showing a method of setting an original fastening point.
Figure 11A:
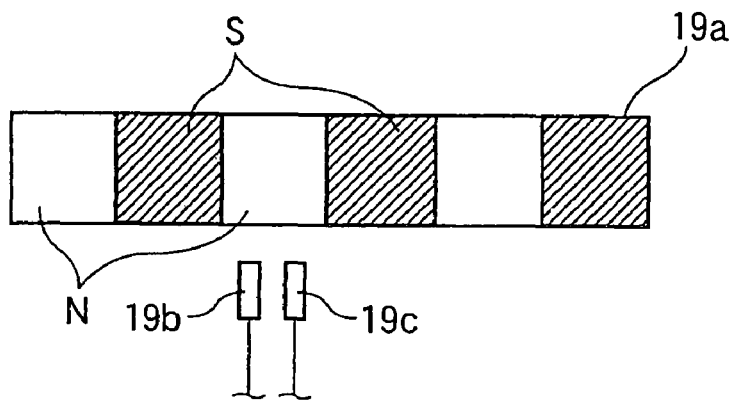
FIGS. 11A to 11C.
Figure 11B:
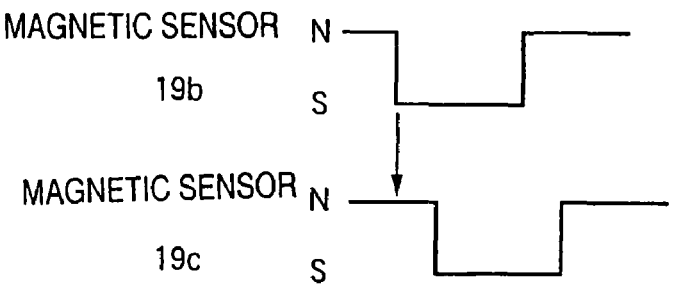
Figure 11C:
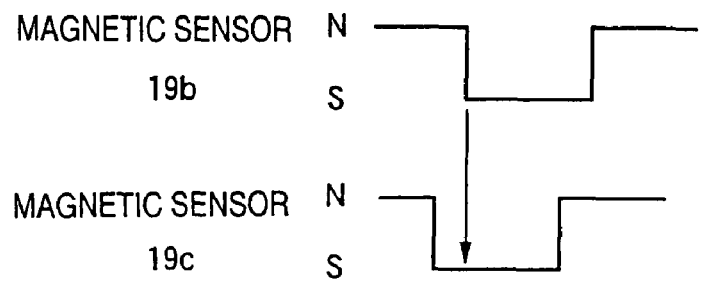
Figure 12:
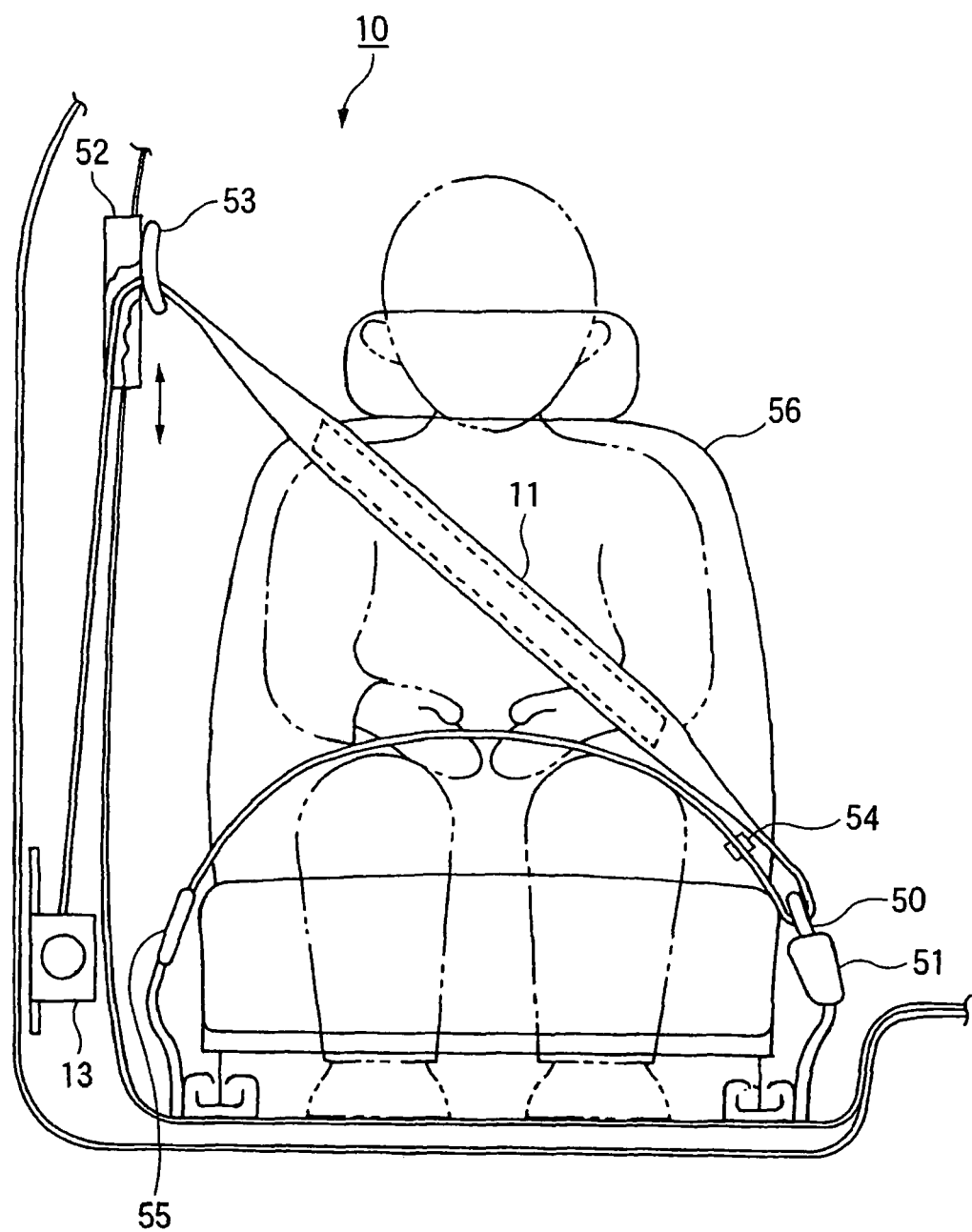
FIG. 12: It is a schematic diagram illustrating a in-vehicle state of the seat belt device shown in FIG. 1.

FIG. 1 is a block diagram of a seat belt device of a first embodiment according to the invention, FIG. 2 is a sectional view of a clutch used in the seat belt device shown in FIG. 1, FIGS. 3 to 6 are diagrams showing operation of the clutch shown in FIG. 2, FIG. 7 is a flowchart showing a first example of control operation of the seat belt device shown in FIG. 1, FIG. 8 is a flowchart showing a second example of control operation of the seat belt device shown in FIG. 1, FIG. 9 is a flowchart showing a method of setting an original fastening point, FIG. 10 is a flowchart showing another method of setting an original fastening point, FIGS. 11A to 11C are diagrams for showing a rotary sensor, and FIG. 12 is a schematic diagram illustrating a in-vehicle state of the seat belt device shown in FIG. 1.

As shown in FIG. 1, a seat belt device 10 according to a first embodiment of the invention mainly includes a webbing 11, a spindle 12, a retractor 13, a winding spring 14, a motor 15, a gear assembly 16, a clutch 17, a damper spring 18, a rotary sensor 19, and a controller 20. In the embodiment, the motor 15 constitutes a power generating unit. The gear assembly 16, the clutch 17, and the damper spring 18 constitute a power transmitting unit. The controller 20 constitutes a control unit.

In the retractor 13, the spindle 12 which winds the webbing 11 is rotatably stored. The winding spring 14 is constantly coupled to the spindle 12 and applies a winding force to the webbing 11. The winding force of the winding spring 14 is set to be very weak, and is set to remove the looseness of the webbing 11 in the breast portion of the user while the webbing 11 is being fastened by the user. In the embodiment, the winding force in the breast portion is set in the range of 0.5 N to 2 N.

The spindle 12 is rotated by the motor 15 through the power transmitting unit in the winding direction when necessary. The motor 15 is rotated as a positive rotation or as a negative rotation depending on a current in a positive direction or a negative direction that is transmitted from the controller 20, and transmits its power to the gear assembly 16. The positive rotation is carried out in a direction in which the power for rotating the spindle 12 in the winding direction of the webbing 11 is generated, and the negative rotation is carried out in a direction in which a power opposite to the above-described power is generated.

The gear assembly 16 is coupled to a motor shaft 22 of the motor 15. The gear assembly 16 rotates in accordance with the positive or negative rotation of the motor shaft 22, and reduces a speed of the rotation force of the motor shaft 22 (amplifies a torque) and transmits the force to the clutch 17.

The clutch 17 transmits the power from the motor 15 to the spindle 12 through the damper spring 18 (power transmittable state) when the motor 15 is positively rotated, whereas the clutch 17 does not transmits the power from the motor 15 (power transmission disabled state) when the motor 15 is inverted.

When the motor 15 is driven for winding, the damper spring 18 prevents the driving force from suddenly being transmitted to the webbing 11, thereby decreasing a shock to the user and preventing discomfort. The configuration of the power transmitting unit will be described in detail below.

The rotary sensor 19 is, for example, a rotary sensor which detects a rotation of the spindle 12 and generates an electric signal such as a pulse signal. As shown in FIG. 11A, the rotary sensor 19 includes a ring-shaped magnetic field generator 19a which rotates in synchronization with the spindle 12 and is magnetized with an N pole and an S pole by turns, and two magnetic sensors 19b, 19c provided around the magnetic field generator 19a. For example, as shown in FIGS. 11B and 11C, it is determined, from an output of the magnetic sensor 19c at the time when an output of the magnetic sensor 19b changes from the N pole to the S pole, that the magnetic field generator 19a is moved rightward in FIG. 11A when the output of the magnetic sensor 19c corresponds to N, and that the magnetic field generator 19a is moved leftward in FIG. 11A when the output of the magnetic sensor 19c corresponds to S. The controller 20 adds the number of pulses when the spindle 12 is positively rotated in the winding direction and subtracts the number of pulses when the spindle 12 is negatively rotated in the drawing direction, thereby converting those numbers of pulses into an amount (length) of winding/drawing of the webbing 11. Such addition and subtraction of the number of pulses may be performed in opposite.

In this way, the rotary sensor 19 detects the rotation amount and the rotation direction of the spindle 12.

The controller 20 includes a CPU, a ROM, a RAM, an input/output interface (I/F), a timer, and a motor driver therein, and controls the motor 15 by using these circuits. A seat movement detecting unit 23, a seat back movement detecting unit 24, and a buckle switch 25 are electrically connected to the controller 20.

The seat movement detecting unit 23 can detect a movement with a conventional seat movement detecting sensor which detects the sliding movement of the seat in a back-and-forth direction. For example, it may be a sensor which converts a stroking amount of a seat of an electric seat device that is moved from a reference position in the back-and-forth direction into a pulse signal. More specifically, when a seat slide motor is rotated toward the front of the seat, the sensor converts the rotation amount into a pulse signal, and when a seat slide motor is rotated toward the rear side of the seat, the sensor converts the rotation amount into a pulse signal. Therefore, the controller 20 adds the signal number (n1) of pulse given from the seat movement detecting unit 23 at the time of moving the seat forward to a reference value (0) stored in advance, and subtracts the signal number (n2) of pulse given from the seat movement detecting unit 23 at the time of moving the seat backward from the added value obtained at the time of moving the seat forward, whereby calculating and recognizing the present position of the seat.

Also the seat back movement detecting unit 24 can detect a movement with a conventional seat back angle detecting sensor. For example, it may be a sensor which converts a stroking amount of the seat back of the electric seat device that is reclined from a reference position into a pulse signal. More specifically, when a reclining motor is rotated in the reclining direction of the seat back, the sensor converts the number of rotation into a pulse signal. Therefore, the controller 20 adds the signal number (n1) of pulse given from the seat back movement detecting unit 24 at the time of reclining the seat back to a reference value (0) stored in advance, and subtracts the signal number (n2) of pulse given from the seat back movement detecting unit 24 at the time of returning the seat from the added value obtained at the time of reclining the seat, whereby calculating and recognizing the present position of the seat back. Meanwhile, since the seat movement detecting unit 23 and the seat back movement detecting unit 24 can be substituted by the rotary sensor 19 which detects the moving amount of the webbing 11, these detecting units 23, 24 are unnecessary in case where the rotary sensor 19 is used.

The buckle switch 25 is in an ON state when a tongue 50 is inserted to a buckle 51 (see FIG. 12), and is in an OFF state when the tongue 50 is not inserted to the buckle 51. Therefore, the controller 20 sets a flag indicating that the seat belt is in use by detecting a current when the buckle switch 25 is ON, and sets a flag indicating that the seat belt is not in use by not detecting a current when the buckle switch 25 is OFF. This switch is conventionally known, and therefore, the detailed description thereof will be omitted.

As shown in FIG. 12, in the seat belt device 10, the retractor 13 is attached to an inside of a vehicle panel constituting a B-pillar disposed in the center portion of the vehicle, and a base end portion of the webbing 11 is coupled to the spindle 12 in the retractor 13. The webbing 11 passes through the D-ring 53 fixed to an adjust-through 52 attached to the B-pillar so as to be movable in an up-and-down direction, and is drawn out to the interior of the vehicle. A tong stopper 54 is attached to a front end portion side of the webbing 11 where it is inserted through the tongue 50, and the front end portion is coupled and fixed to a wrap anchor 55. The tongue 50 is disposed to be movable between the D-ring 53 and the stopper 54 along the webbing 11. The webbing 11 not in use is wound and stored in the retractor 13, whereby the tongue 50 is locked to the tongue stopper 54, and is held so as not to drop from a position close to the D-ring 53 on the B-pillar. The buckle 51 is provided on an inner side of the interior of vehicle with the seat 56 interposed between the buckle 51 and the retractor 13, and holds the occupant seated on the seat 56 when the tongue 50 is inserted thereto.

Figure 3:
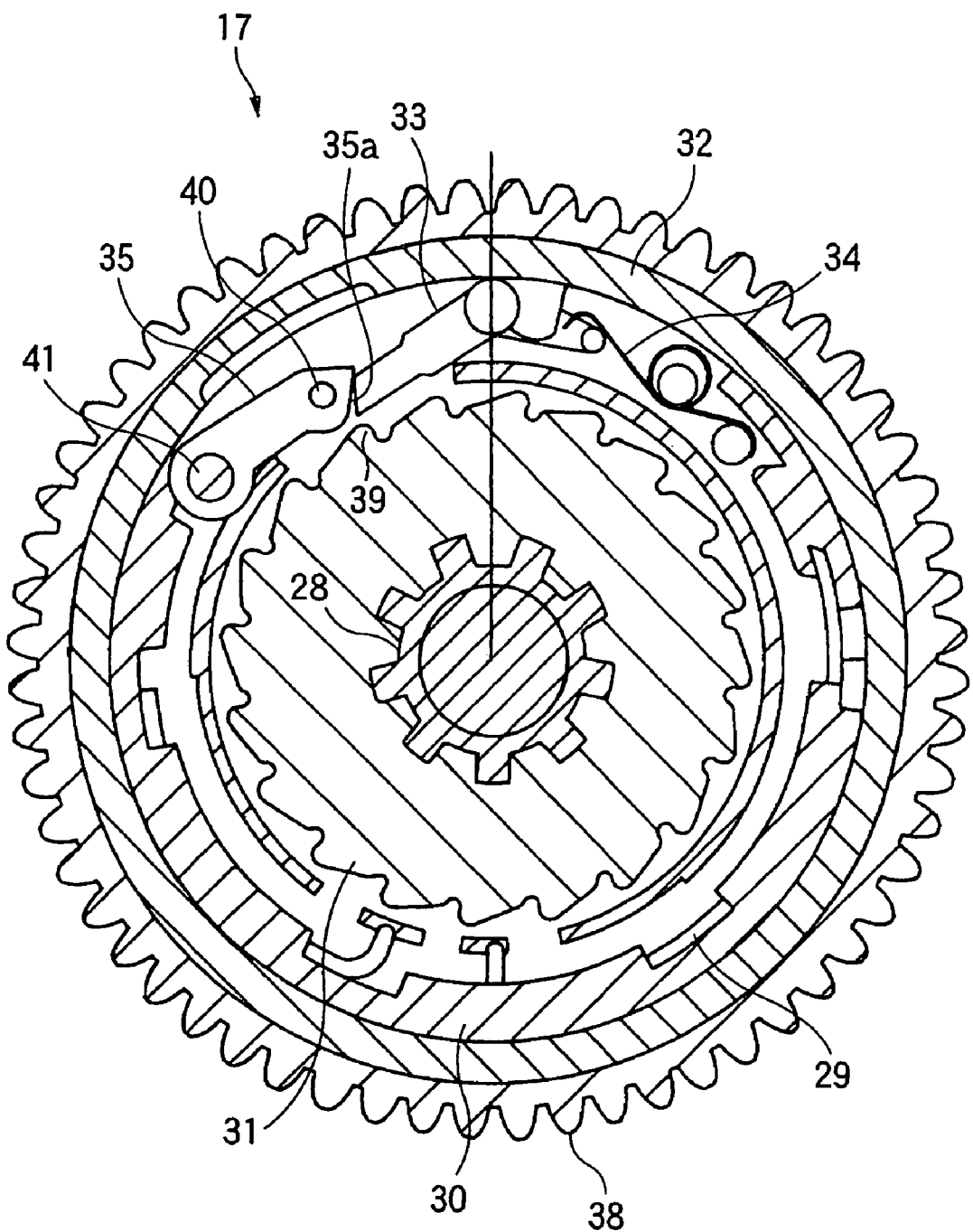
FIG. 3: It is a diagram showing an operation of the clutch shown in FIG. 2.

Next, a configuration of the power transmitting unit will be described with reference to FIGS. 2 and 3. A final clutch gear 38 of the gear assembly 16, the clutch 17, and the damper spring 18 are housed in a clutch housing 27 provided on a side of a frame of the retractor 13. The clutch 17 includes a joint 28, a friction spring 29, a clutch wheel 30, a latch plate 31, a ring 32, a pole 33, a return spring 34, and a rotor cam 35.

The joint 28 is concentrically coupled to the spindle 12, and is rotated together with the spindle 12. The friction spring 29 is formed in a ring shape, and an end portion thereof is engaged with the clutch housing 27. The friction spring 29 slidably supports the clutch wheel 30 disposed in an inner peripheral portion of the ring 32.

The latch plate 31 has a teeth portion 39 formed on a peripheral portion thereof, and is coupled to the joint 28 through the damper spring 18. More specifically, the damper spring 15 is a torsion coil spring assembled between the joint 28 and the latch plate 31, having a coil part stored inside the joint 28, one end portion engaged with the joint 28, and the other end portion engaged with the latch plate 30, thereby preventing the driving force from suddenly being transmitted to the webbing 11 when the motor 15 driven for winding and the latch plate 31 rotates.

The pole 33 is swingably supported at a part of the ring 32 that is rotatably provided in the inner peripheral portion of the final gear 38, and is constantly biased by the return spring 34 in a direction in which it is released from the latch plate 31. The return spring 34 has one end portion engaged with the end portion of the pole 33 and the other end portion engaged with a part of the ring 32. When the final gear 38 is rotated due to the positive rotation of the motor 15, the pole 33 is swung toward the latch plate 31 along a cam surface 35a of the rotor cam 35, and engages with the teeth portion 39 of the latch plate 31. Accordingly, the final gear 38 is coupled to the spindle 12 through the latch plate 31.

The rotor cam 35 is usually fixed so as not to swing by a shearing pin 40 (shown in FIG. 3), and has a cam surface 35a which contacts with the pole 33 when the pole 33 rotates together with the final gear 38. When a pretensioner is in operation, the shearing pin 40 is ruptured, whereby the rotor cam 35 is swung around a shaft 41 and evacuates the pole 33 from the latch plate 31 so that the clutch 17 does not operate.

Figure 4:
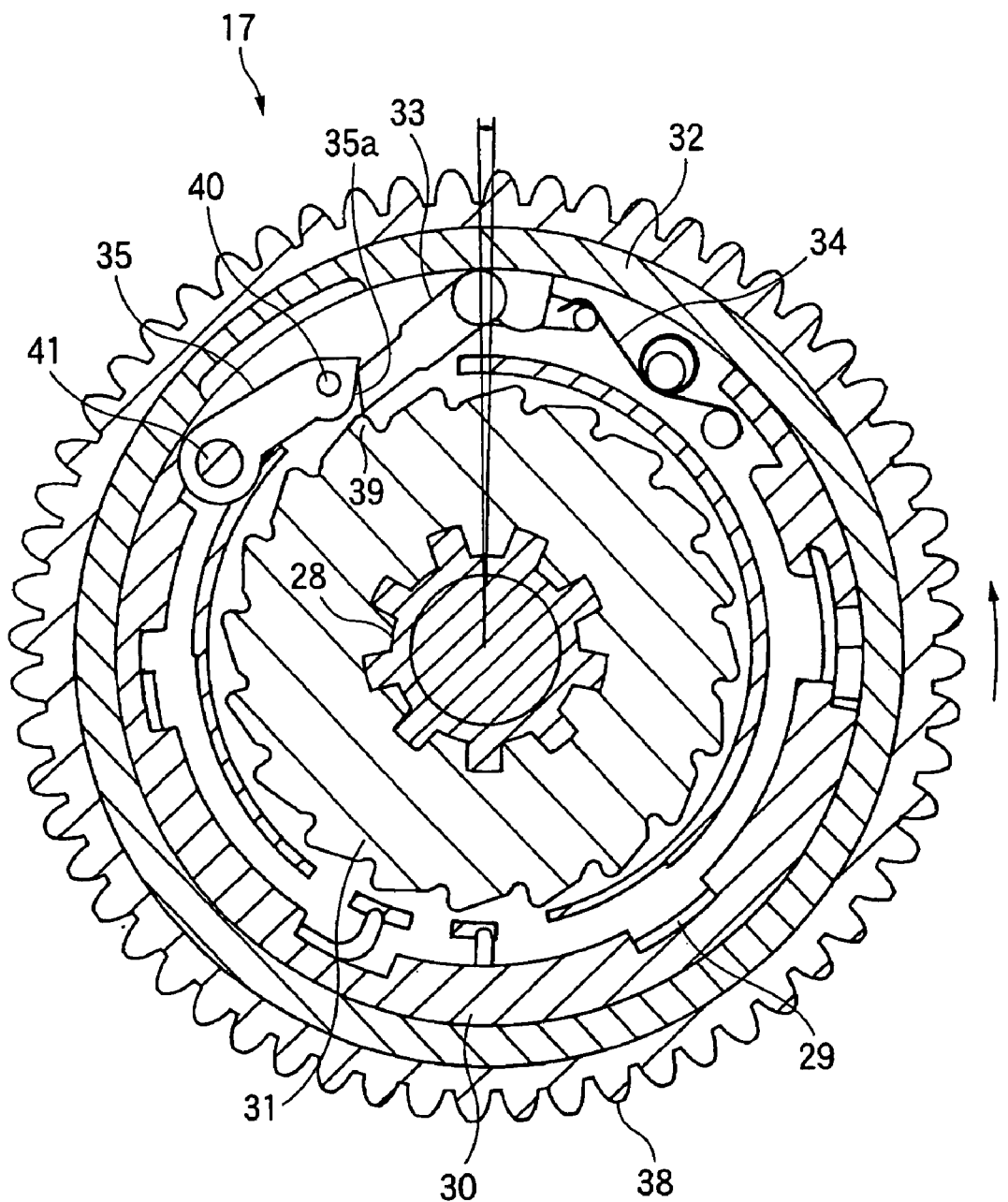
FIG. 4: It is a diagram showing an operation of the clutch shown in FIG. 2.

Next, an operation of the clutch 17 will be described with reference to FIGS. 3 to 6. As shown in FIG. 3, when the motor 15 is not driven for winding, the pole 33 is not engaged with the teeth portion 39 of the latch plate 31. Accordingly, the spindle 12 is rotatable in any direction. As shown in FIG. 4, when the motor 15 starts to positively rotate by being supplied with a current from the controller 20, the final gear 38 coupled to the motor shaft 22 by gear is rotated in an anticlockwise direction in FIG. 4. Then, the pole 33 moves in the anticlockwise direction together with the ring 32 and the pole 33 is swung toward the latch plate 31 along the cam surface 35a of the rotor cam 35 against the biasing force of the return spring 34.

As shown in FIG. 5, when the final gear 38 is further rotated by the power of the motor 15, the pole 33 engage s with the teeth portion 39 of the latch plate 31. Accordingly, the clutch 17 is engaged and is set to the power transmittable state in which the power of the motor 15 can be transmitted to the spindle 12. Since the rotating power of the latch plate 31 is transmitted to the spindle 12 through the damper spring 18, the webbing 11 is wound. At this time, the rotor cam 35 and clutch wheel 30 are slid and rotated against the friction spring 29. The motor 15 stops its operation when the webbing 11 is completely wound.

As shown in FIG. 6, when the motor 15 is inverted by being supplied with a current from the controller 20, the pole 33 is rotated in a clockwise direction in FIG. 6 together with the final gear 38. However, the rotor cam 35 and the clutch wheel 30 are not rotated while being biased by the friction spring 29. Since the pole 33 becomes apart from the rotor cam 35 and swings in a direction away from the latch plate 31 by the return spring 34, the pole 33 is slipped out of the teeth portion 39 of the latch plate 31, the clutch 17 is released, and thus is set to the power transmission disabled state in which the power of the motor 15 cannot be transmitted to the spindle 12.

As shown in FIG. 2, a sensor housing 37 accommodating the rotary sensor 19 and a magnetic plate 36 is attached to the outside of the clutch housing 27. The magnetic plate 36 is coupled to a front end of the joint 28, and for example, the N pole and the S pole are magnetized on an outer peripheral portion thereof in the circumferential direction by turns. The rotary sensor 19 is assembled to the outer peripheral portion of the magnetic plate 36 in a non-contact manner, and the magnetic plate 36 is rotated together with the joint 28, whereby the rotary sensor 19 outputs a pulse signal that is proportional with the number of rotation of the joint 28.

In such a seat belt device 10, when at least one of the seat movement detecting unit 23 which detects that the seat is moved rearward or the seat back movement detecting unit 24 which detects that the seat back is reclined detects a movement, the motor 15 is driven to wind the webbing 11 whereby the looseness is removed by winding the webbing 11 (hereinafter, referred to as a looseness removing operation).

The rearward movement of the seat or rearward reclining of the seat back may be detected with the rotary sensor 19 which detects the movement of the webbing 11 by detecting the rotation amount of the spindle 12 and detecting whether the webbing is wound from the original fastening point (existence and nonexistence of winding through the weak winding spring 14).

The above-mentioned original fastening point is set as an original fastening point at the followings occasions.

(a) at a point when an operation for fastening the seat belt is completed (b) at a point when the looseness removing operation is completed (c) at a point when a predetermined time lapses in a state in which the webbing fastened and the webbing is stopped In (a), the operation for fastening the seat belt is as follows. When the buckle switch 25 detects that the tongue 50 is inserted to the buckle 51 from the non-fastened state, the motor 15 is driven in the winding direction of the webbing 11 by a predetermined electric power and the webbing 11 is wound. When the looseness is then removed after a few moments, the motor 15 that is driven at the predetermined electric power cannot perform the winding so that the winding stops. Then, the rotary sensor 19 detects that the winding is stopped, whereby the motor 15 is rotated in a direction opposite to the winding direction of the webbing 11, and the clutch 17 is released. Accordingly, only a weak winding force by the weak winding spring 14 acts on the webbing 11. This series of operations is the operation for fastening. At the time of completing the operation, a winding amount (or a drawing amount) of the webbing 11 at the time is set as the original fastening point, and is stored in a memory RAM in the controller 20.

In (b), the looseness removing operation is an operation which is performed when the rotary sensor 19 detects that the webbing 11 is wound by the weak winding spring 14 from the original fastening point. The motor 15 is driven in the winding direction of the webbing 11 by a predetermined electric power and the webbing 11 is wound. When the looseness is then removed after a few moments, the motor 15 that is driven at the predetermined electric power cannot perform the winding so that the winding stops. Then, the rotary sensor 19 detects that the winding is stopped, whereby the motor 15 is rotated in a direction opposite to the winding direction of the webbing 11, and the clutch 17 is released. Accordingly, only a weak winding force by the weak winding spring 14 acts on the webbing 11. This series of operations is the looseness removing operation. At the time of completing the operation, a winding amount (or a drawing amount) of the webbing 11 at the time is set as the original fastening point, and is stored in a memory RAM in the controller 20.

In (c), the buckle switch 25 detects that the seat belt is fastened, and the rotary sensor 19 detects that the occupant is not drawing or winding the webbing 11. When this state continues for a predetermined period of time, the winding amount (or the drawing amount) of the webbing 11 at the time is set as the original fastening point, and is stored in a memory RAM in the controller 20.

Next, a first example of the control operation of the seat belt device 10 will be described with reference to the FIG. 7.

As shown in FIG. 7, in the first example of the control operation, when the seat is slid and moved rearward and then the movement stops or the seat back is reclined rearward and then the reclining stops while the seat belt is fastened (S101), the motor 15 is driven for winding at a predetermined electric power, that is, a predetermined driving force (the winding force is set in the range of 5 N to 20 N in the embodiment) (S102) in order to remove the looseness of the webbing 11. Namely, in the first example, the seat state detecting unit which detects a variation in a state of the seat includes at least one of the seat movement detecting unit 23 and the seat back movement detecting unit 24, and operates as the looseness detecting unit which detects the looseness of the webbing. When the seat is slid and moved rearward and then stopped or when the seat back is reclined rearward and then stopped while the seat belt is not fastened, the motor is not driven and is returned as it stands.

When the looseness is removed after a few moments, the motor 15 stops driving since the winding cannot be performed with the predetermined electric power (S103). The rotary sensor 19 which detects the rotation amount of the spindle 12 detects the stopped state. When the stopped state is detected, the clutch 17 is released (S104). The release of the clutch is performed by rotating the motor 15 in a direction opposite to the winding direction. After the clutch is released, the motor 15 stops (S105). Since only winding force by the weak winding spring 14 acts on the spindle 12, the occupant feels less pressure from the webbing 11 and can easily draw the webbing 11 with a small power. A process for setting the original fastening point (S106) will be described in a second example of the control operation shown in FIG. 8.

Next, a second example of the control operation of the seat belt device 10 will be described with reference to FIG. 8. In the second example, a difference from the first example is that the rotary sensor 12 which detects the rotation amount of the spindle 12 winding the webbing 11 detects the rearward movement of the seat or the rearward reclining of the seat back.

As shown in FIG. 8, when the seat is moved rearward or the seat back is reclined rearward while the seat belt is fastened, the rotary sensor 19 detects that the webbing 11 is moved toward the winding from the original fastening point. When this movement is detected (S201), the motor 15 is driven for winding at a predetermined electric power, that is, a predetermined driving force (the winding force of 5 N to 20 N) (S202) in order to remove the looseness of the webbing 11. Namely, the seat state detecting unit which detects a variation in a state of the seat includes the rotary sensor 19, and operates as the looseness detecting unit. When the webbing 11 is not moved toward the winding from the original fastening point, the motor is not driven, and is returned as it stands.

When the looseness is removed after a few moments, the motor 15 stops since the winding cannot be performed by the predetermined electric power. The rotary sensor 19 which detects the rotation amount of the spindle 12 detects whether the winding is stopped (S203). When the stopped state is detected, the clutch 17 is released (S204). The release of the clutch is performed by rotating the motor 15 in a direction opposite to the winding direction of the webbing 11. After the clutch is released, the motor 15 stops (S205). Since only winding force by the weak winding spring 14 acts on the spindle 12, the occupant feels less pressure from the webbing 11, and can easily draw the webbing 11 with a small power. Upon releasing the clutch, the webbing 11 moves to some extent in the drawing direction due to an elastic force from the occupant, or their clothes. However, the original fastening point is set after such a movement (S206).

FIGS. 9 and 10 are flowcharts illustrating methods of setting the original fastening point that are performed when the operation for fastening the seat belt is completed and when a predetermined period of time is lapsed while the webbing is fastened and is stopped, other than to the method of setting the original fastening point after the looseness removing operation.

As shown in FIG. 9, the method of setting the original fastening point is performed after the operations that are performed after the occupant intending to fasten the seat belt fastens the seat belt. Specifically, when a fastened state is detected by the buckle switch 25 (S211) so that a non-fastened state is set to the fastened state, the motor 15 is driven for winding in a predetermined electric power (S212), that is, a predetermined driving force (winding force in the range of 5 N to 20 N) in order to remove the unnecessary looseness of the webbing 11 after fastening.

When the looseness is removed after a few moments, the motor 15 stops (S213) since the winding cannot be performed by the predetermined electric power. The rotary sensor 19 which detects the rotation amount of the spindle 12 detects the stopped state. When the stopped state is detected, the clutch 17 is released (S214) and the motor 15 stops (S215). The release of the clutch is performed by rotating the motor 15 in a direction opposite to the winding direction. Since only winding force by the weak winding spring 14 acts on the spindle 12 after releasing the clutch, the occupant feels less pressure from the webbing 11, and can easily draw the webbing 11 with a small power. At this time, upon releasing the clutch, the webbing 11 is moved to some extent in the drawing direction due to an elastic force from the occupant or their clothes. However, the original fastening point is set after such a movement (S216).

As shown in FIG. 10, another method of setting the original fastening point is as follows. For example, an occupant fastening the seat belt moves the seat or the seat back to approximately 200 mm forward, or moves his/her own seated position to approximately 200 mm forward, and keeps driving or riding in this state for a while, thereafter, the occupant moves the seat or the seat back to approximately 100 mm rearward, or moves his/her own seated position to approximately 100 mm rearward. Considering this context, extra looseness is occurred on the webbing 11 by the rearward movement (or reclining), however, the looseness is not removed since the spindle 12 is not wound toward the winding from the original fastening point. The method is to prevent this situation. That is, when the seat belt is fastened and the movement of the webbing 11 is stopped for a predetermined time (three seconds for instance) (S221), the position is set (updated) as a new original fastening point (S222).

According to the seat belt device 10 as described above, when detecting a variation in a state of the seat such that the webbing 11 is loose with the webbing 11 fastened, the motor 15 is controlled to rotate in the winding direction of the webbing 11. Accordingly, the looseness of the webbing 11 on the occupant can be removed by driving the motor 15 to wind the webbing 11, whereby the webbing 11 is further reliably fastened.

According to the seat belt device 10, when detecting a variation in a state of the seat such that the webbing 11 is loose with the webbing 11 fastened, the motor 15 is controlled to rotate in the winding direction of the webbing 11. Then, the motor 15 generates the power opposite to the power for rotating the spindle 12 in the winding direction, and thus the clutch 17 is set to the power transmission disabled state. Accordingly, since only the weak winding force acts on the spindle 12, the webbing 11 can be easily drawn in use.

According to the seat belt device 10, since the looseness detecting unit serving as the seat state detecting unit is at least one of the seat movement detecting unit 23 which detects that the seat is moved in a back-and-forth direction and the seat back movement detecting unit 24 which detects that the seat back is reclined, or the rotary sensor 19 which detects the rotation amount of the spindle 12, it is unnecessary to provide the seat state detecting unit separately. Accordingly, the looseness of the webbing 11 can be prevented with the existing configuration.

Next, a seat belt device according to a second embodiment of the invention will be described in detail with reference to the drawings. The same parts as the first embodiment is denoted with the same reference numerals and the description thereof will be omitted or simplified.

Figure 13:
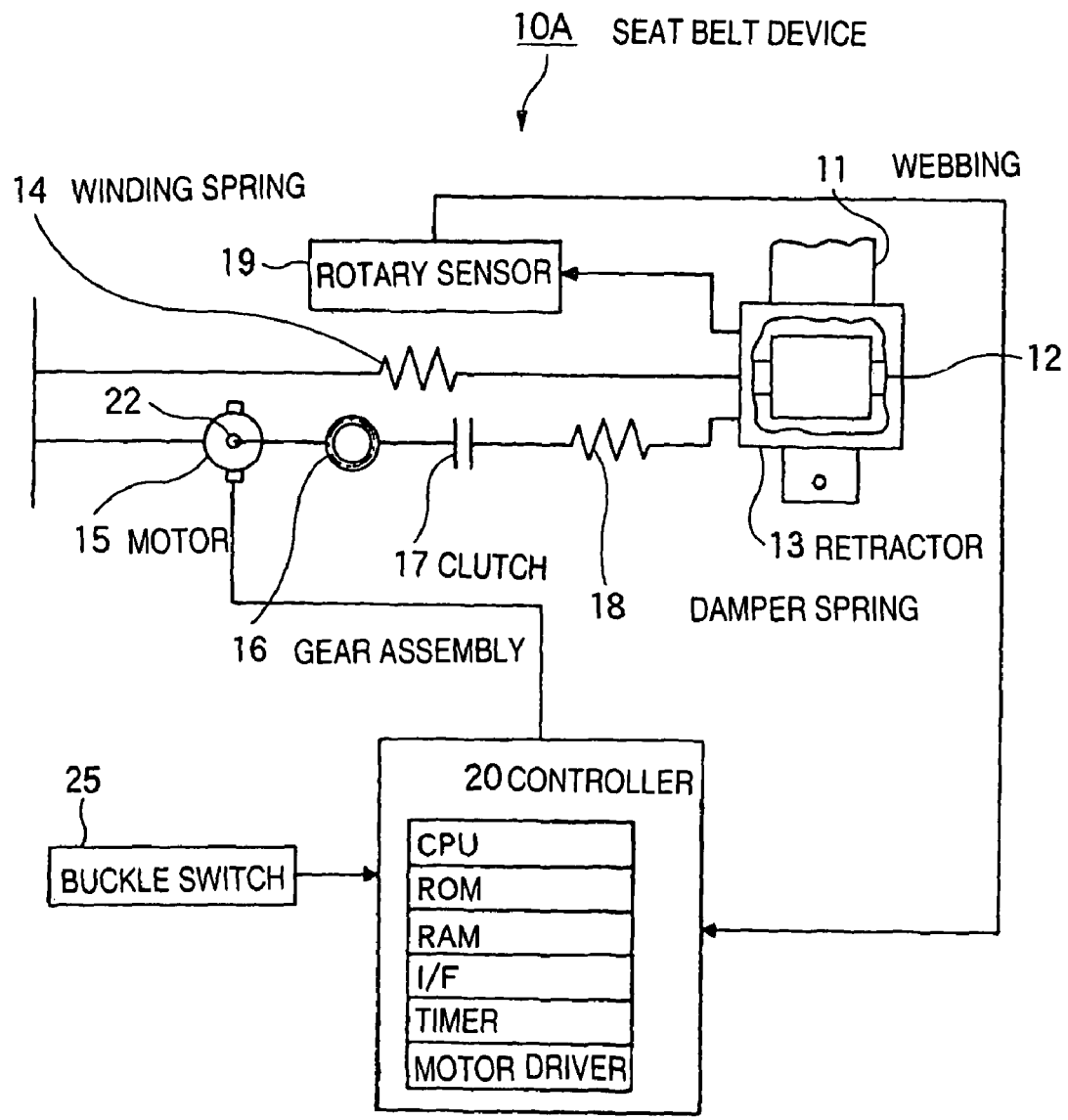
FIG. 13: It is a block diagram of a seat belt device of a second embodiment according to the invention.
Figure 14:
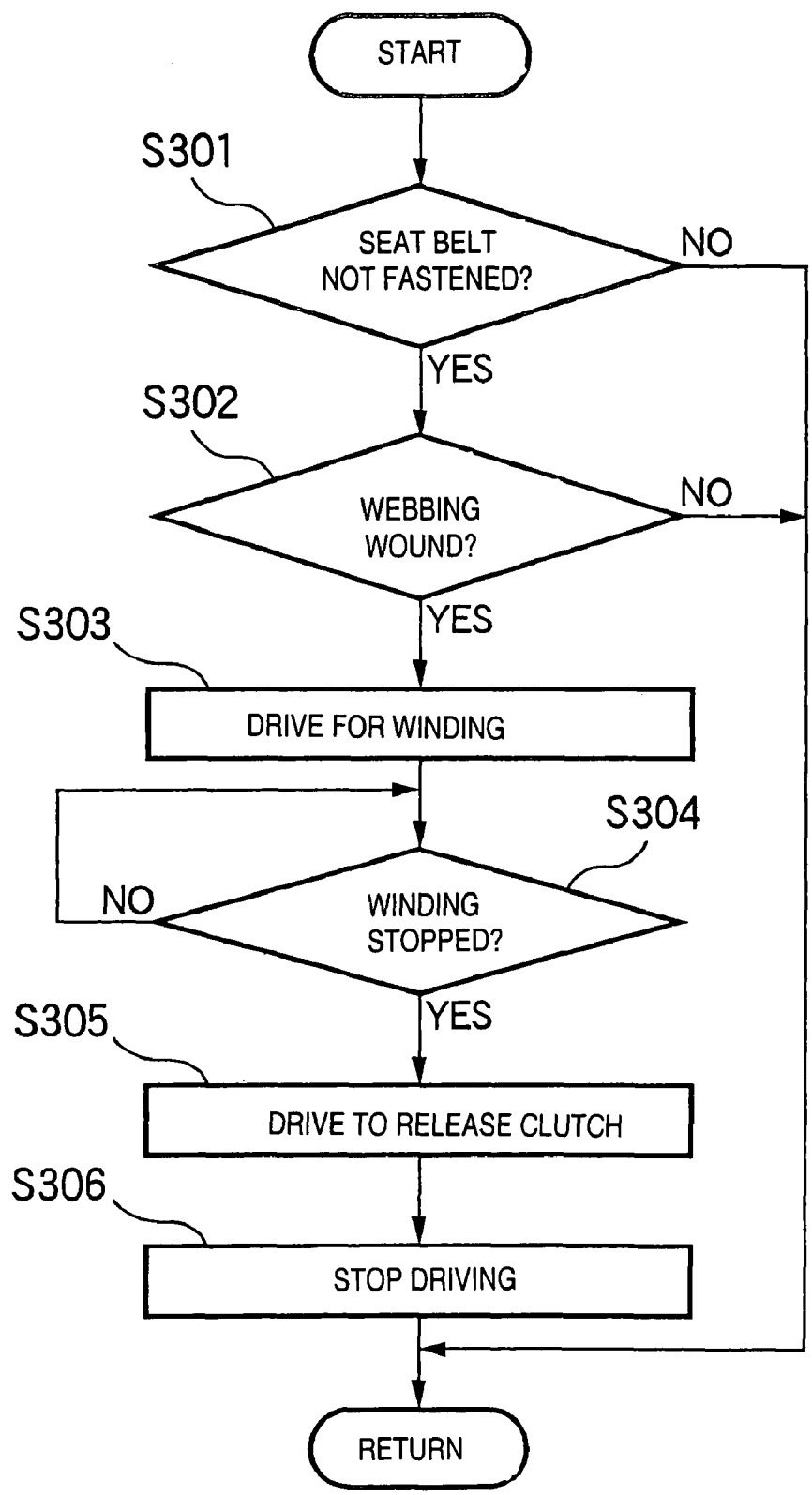
FIG. 14: It is a flowchart showing operation of the seat belt device shown in FIG. 13.

FIG. 13 is a block diagram of a seat belt device according to the second embodiment of the invention, and FIG. 14 is a flowchart showing a control operation of the seat belt device shown in FIG. 13.

As shown in FIG. 13, a seat belt device 10A of the second embodiment of the invention mainly includes a webbing 11, a spindle 12, a retractor 13, a winding spring 14, a motor 15, a gear assembly 16, a clutch 17, a damper spring 18, a rotary sensor 19, and a controller 20. In the embodiment, the motor 15 constitutes a power generating unit. The gear assembly 16, the clutch 17, and the damper spring 18 constitute a power transmitting unit. The rotary sensor 19 constitutes guide-position variation detecting unit. The controller 20 constitutes a control unit. The adjust-through 52 shown in FIG. 12 of the first embodiment constitutes a position adjusting unit and the D-ring 53 constitutes a webbing guide. The rotary sensor 19 of the embodiment may constitute a looseness detecting unit which detects the looseness of the webbing.

Next, the operation of the seat belt device 10A will be described with reference to FIG. 14. This program is periodically executed.

As shown in FIG. 14, whether the seat belt is in a non-use state or not (S301) is detected. This is performed by detecting a state of the buckle switch 23 by the controller 20. When it is detected that the seat belt is in a use state, it is returned as it stands. On the other hand, when the seat belt is in a non-fastened and stored state, that is, when the webbing 11 is not in use, the looseness of the webbing 11 occurs between the D-ring 53 and the retractor 13 by moving the adjust-through 52 downward. Such a looseness of the webbing 11 is wound by the weak winding spring 14 so that the spindle 12 rotates (S302).

The rotary sensor 19 detects that the adjust-through 52 is moved down from the rotation of the spindle 12. Specifically, the looseness of the webbing between the D-ring 53 and the retractor 13 can be wound since it is different from the looseness between the D-ring 53 and wrap anchor 55 in that a friction between the D-ring 53 and the webbing 11 or a load due to a weight of the tongue 50 which disturb the winding does not exist. Accordingly, the spindle 12 rotates in the winding direction, whereby the rotary sensor 19 can detect the winding, and it is detected that the adjust-through 52 is moved down.

When the moving down of the adjust-through 52 is detected, the controller 20 drives the motor 15 to rotate in a predetermined electric power, that is, a predetermined driving force (winding force in the range of 5 N to 20 N in the embodiment) in order to remove the looseness of the webbing 11 between the D-ring 27 and a wrap anchor 55, and the clutch 17 is engaged (S303). Namely, the controller 20 controls the motor 15 to rotate in the winding direction of the webbing 11, whereby the loose webbing 11 due to the moving down of the adjust-through 52 is wound. Accordingly, when the adjust-through 52 is moved down, the looseness of the webbing 11 does not occur so that the webbing 11 does not become a loose stored state.

Eventually, when the looseness of the webbing 11 is removed by the rotating force of the motor 15, the predetermined electric power does not drive to wind. Accordingly, the motor 15 stops. The rotary sensor 19 detects that the motor 15 is stopped from the rotation amount of the spindle 12 (S304). When the stopped state is detected, the clutch is released (S305). The release of the clutch 17 is performed by rotating the motor 15 in a direction opposite to the winding direction and the motor 15 stops (S306). Accordingly, since only a winding force by the weak winding spring 14 acts on the spindle 12, the webbing 11 can be easily drawn with a small power in use.

According to the seat belt device 10A as described above, when the adjust-through 52 is moved down, the controller 20 controls the motor 15 to rotate in the winding direction of the webbing 11. Accordingly, the loose webbing 11 due to the moving down of the adjust-through 52 is wound. Therefore, even when the adjust-through 52 is moved down, the webbing 11 does not become loose. Consequently, the stored state is not loose and quality can be improved.

According to the seat belt device 10A, when detecting that the adjust-through 52 moved down, the controller 20 controls the motor 15 to rotate in the winding direction of the webbing 11. Then, the controller 20 controls the motor 15 to generate the power opposite to the power for rotating in the winding direction so as to set the motor 15 to the power transmission disabled state. Accordingly, since only weak winding force acts on the spindle 12, the webbing 11 can be easily drawn with a small power in use.

According to the seat belt 10A, since the rotary sensor which detects the rotation amount of the spindle detects the moving down of the adjust-through 52, it is unnecessary to provide means for detecting the moving down of the adjust-through 52 separately, and the looseness of the webbing 11 can be prevented by the existing configuration.

The invention is not limited to the embodiments and various changes and modification may be made therein. The structures of the clutches of the embodiments are examples and the parts constituting the clutch are not limited.

The present application is based on Japanese Patent application No. 2004-316205 filed on Oct. 29, 2004 and Japanese Patent application No. 2004-316215 filed on Oct. 29, 2004, the contents of which are incorporated herein by reference.

The invention claimed is:

1. A seat belt device comprising:
   a spindle which winds a webbing;
   a winding spring which is coupled to the spindle and applies a winding force to the webbing:
   a power generating unit which generates a power for rotating the spindle in a desired direction;
   a rotary sensor which detects a rotation amount of the spindle;
   a power transmitting unit which is set to a power transmittable state when the power generating unit generates the power for rotating the spindle in a winding direction of the webbing, the power from the power generating unit being transmittable to the spindle in the power transmittable state, and is set to a power transmission disabled state when the power generating unit generates a power in a direction opposite to the power for rotating the spindle in the winding direction, the power from the power generating unit being disabled to be transmitted to the spindle in the power transmission disabled state; and
   a control unit which controls the power generating unit based on the rotation amount detected by the rotary sensor;
   wherein the control unit controls the power generating unit to rotate in the winding direction of the webbing when the rotary sensor detects that the webbing is wound by the winding spring.

2. The seat belt device according to claim 1, wherein the control unit controls the power generating unit to rotate in the winding direction of the webbing when the rotary sensor detects that the webbing is wound by the winding spring, and thereafter, controls the power generating unit to rotate in the direction opposite to the winding direction so as to set the power transmitting unit to the power transmission disabled state.

3. The seat belt device according to claim 1, further comprising a guide-position adjusting unit which adjusts a position of a webbing guide through which the webbing is inserted,
wherein the winding spring winds the webbing when the guide-position adjusting unit is moved down.

4. The seat belt device according to claim 1, wherein the winding spring winds the webbing when a seat is moved rearward or when a seat back is reclined rearward.

5. A seat belt device comprising:
a spindle which winds a webbing;
a power generating unit which generates a power for rotating the spindle in a desired direction;
a power transmitting unit which is set to a power transmittable state when the power generating unit generates the power for rotating the spindle in a winding direction of the webbing, the power from the power generating unit being transmittable to the spindle in the power transmittable state, and is set to a power transmission disabled state when the power generating unit generates a power in a direction opposite to the power for rotating the spindle in the winding direction, the power from the power generating unit being disabled to be transmitted to the spindle in the power transmission disabled state;
a control unit which controls the power generating unit;
a guide-position adjusting unit which adjusts a position of a webbing guide through which the webbing is inserted; and
a guide-position variation detecting unit which detects a variation in a position of the guide-position adjusting unit,
wherein the control unit controls the power generating unit to rotate in the winding direction of the webbing when the guide-position variation detecting unit detects that the guide-position adjusting unit is moved down.

6. The seat belt device according to claim 5, wherein the control unit controls the power generating unit to rotate in the winding direction of the webbing when the guide-position variation detecting unit detects that the guide-position adjusting unit is moved down, and thereafter, the control unit controls the power generating unit to rotate in a direction opposite to the winding direction so as to set the power transmitting unit to the power transmission disabled state.

7. The seat belt device according to claim 5, wherein the guide-position variation detecting unit is a rotary sensor which detects a rotation amount of the spindle.

8. The seat belt device of claim 1, wherein the rotary sensor includes a ring-shaped magnetic field generator which rotates in synchronization with the spindle, and two magnetic sensors around the magnetic field generator.

9. The seat belt device of claim 7, wherein the rotary sensor includes a ring-shaped magnetic field generator which rotates in synchronization with the spindle, and two magnetic sensors around the magnetic field generator.

10. A seat belt device comprising:
a retractor including a spindle;
a webbing coupled to the spindle and wound by the spindle, the webbing passing through a D-ring fixed to a movable adjust-through member, the adjust-through member guiding a position of the D-ring;
a winding spring coupled to the spindle for applying a winding force to the webbing;
a power generating unit for generating a power for rotating the spindle in a desired direction;
a rotary sensor for detecting a rotation amount of the spindle, the rotary sensor including a magnetic field generator and two magnetic sensors;
a power transmitting unit including a gear assembly, a clutch and a damper spring, wherein the power transmitting unit is set to a power transmittable state when the power generating unit generates the power for rotating the spindle in a winding direction of the webbing, the power from the power generating unit being transmittable to the spindle in the power transmittable state, and is set to a power transmission disabled state when the power generating unit generates a power in a direction opposite to the power for rotating the spindle in the winding direction, the power from the power generating unit being disabled to be transmitted to the spindle in the power transmission disabled state; and
a control unit for controlling the power generating unit to rotate in the winding direction of the webbing when the rotary sensor detects the movement of the adjust-through member.

* * * * *